(12) United States Patent
Shiao et al.

(10) Patent No.: US 7,812,495 B2
(45) Date of Patent: Oct. 12, 2010

(54) SLEEVE IN END RINGS FOR PERMANENT MAGNET ROTOR

(75) Inventors: Sam Shiao, Cerritos, CA (US); Dave Elpern, Los Angeles, CA (US); Terry Morris, Garden Grove, CA (US); Bob Dietrich, Montebello, CA (US)

(73) Assignee: Honeywell International Inc., Morristown, NJ (US)

( * ) Notice: Subject to any disclaimer, the term of this patent is extended or adjusted under 35 U.S.C. 154(b) by 6 days.

(21) Appl. No.: 12/122,353

(22) Filed: May 16, 2008

(65) Prior Publication Data

US 2009/0284093 A1  Nov. 19, 2009

(51) Int. Cl.
*H02K 21/12* (2006.01)
*H02K 1/27* (2006.01)
*H02K 21/14* (2006.01)

(52) U.S. Cl. .................... 310/156.22; 310/156.01; 310/156.03; 310/156.08; 310/156.09; 310/156.27; 310/156.28; 310/156.29

(58) Field of Classification Search .......... 310/42, 310/156.22, 262, 156.01, 156.03, 156.08, 310/156.09, 156.27, 156.28, 156.29; *H02K 21/12, H02K 1/27, 21/14*
See application file for complete search history.

(56) References Cited

U.S. PATENT DOCUMENTS

| | | | | |
|---|---|---|---|---|
| 2,484,386 A * | 10/1949 | Meussdorffer | ............... | 310/265 |
| 2,688,874 A * | 9/1954 | Batchelder | .................... | 73/260 |
| 2,927,229 A * | 3/1960 | Merrill | ........................ | 310/162 |
| 3,479,626 A * | 11/1969 | Silverman et al. | ........... | 335/266 |
| 3,518,467 A * | 6/1970 | Wightman | .................... | 310/63 |
| 4,012,651 A * | 3/1977 | Burson | ........................ | 310/153 |
| 4,208,784 A * | 6/1980 | Kincel | ......................... | 29/596 |
| 4,219,752 A * | 8/1980 | Katou | .................... | 310/156.19 |
| 4,433,261 A * | 2/1984 | Nashiki et al. | ......... | 310/156.28 |
| 4,674,178 A * | 6/1987 | Patel | ............................ | 29/598 |
| 4,746,827 A * | 5/1988 | Ochiai et al. | ........... | 310/156.22 |
| 4,809,590 A * | 3/1989 | Naumann et al. | ............. | 92/125 |
| 4,816,707 A * | 3/1989 | Vanderlaan | .................. | 310/36 |
| 4,910,861 A * | 3/1990 | Dohogne | ............... | 310/156.12 |
| 4,928,028 A * | 5/1990 | Leibovich | ..................... | 310/23 |
| 4,933,583 A * | 6/1990 | Ripplinger | ............. | 310/156.22 |
| 5,040,286 A * | 8/1991 | Stark | ..................... | 310/156.28 |
| 5,111,094 A * | 5/1992 | Patel et al. | ............. | 310/156.22 |
| 5,144,735 A * | 9/1992 | Stark | ........................... | 29/732 |
| 5,175,461 A * | 12/1992 | Zigler et al. | ........... | 310/156.28 |
| 5,233,252 A * | 8/1993 | Denk | ......................... | 310/254 |
| 5,237,737 A * | 8/1993 | Zigler et al. | ........... | 310/156.21 |
| 5,292,284 A * | 3/1994 | Denk et al. | ............. | 310/156.28 |
| 5,345,129 A * | 9/1994 | Molnar | .................. | 310/156.28 |
| 5,345,669 A * | 9/1994 | Zigler et al. | ........... | 310/156.21 |
| 5,424,632 A * | 6/1995 | Montagu | ..................... | 310/36 |
| 5,462,054 A * | 10/1995 | Rapoport et al. | ............ | 335/296 |
| 5,563,463 A * | 10/1996 | Stark | ..................... | 310/156.28 |
| 5,623,241 A * | 4/1997 | Minkoff | ..................... | 335/296 |
| 5,675,204 A * | 10/1997 | Kusumoto et al. | ..... | 310/154.17 |

(Continued)

*Primary Examiner*—Quyen Leung
*Assistant Examiner*—Michael Andrews
(74) *Attorney, Agent, or Firm*—Oral Caglar, Esq.

(57) ABSTRACT

A permanent magnet rotor for an electric motor may include a rotor assembly that will hold the magnets in place. A pair of rings is added to the sleeve to tightly engage and press against the end plates and the magnets. This configuration provides additional securement against axial and radially shifting of the magnets.

10 Claims, 6 Drawing Sheets

U.S. PATENT DOCUMENTS

| | | | |
|---|---|---|---|
| 5,714,823 A * | 2/1998 | Shervington et al. | 310/184 |
| 5,881,447 A * | 3/1999 | Molnar | 310/156.28 |
| 5,881,448 A * | 3/1999 | Molnar | 310/156.28 |
| 5,998,902 A * | 12/1999 | Sleder et al. | 310/153 |
| 6,075,301 A * | 6/2000 | Shinoda | 310/154.17 |
| 6,104,115 A * | 8/2000 | Offringa et al. | 310/156.28 |
| 6,531,864 B2 * | 3/2003 | Montagu | 324/146 |
| 6,633,101 B2 * | 10/2003 | Stokes | 310/208 |
| 6,639,496 B1 * | 10/2003 | van Namen | 335/234 |
| 6,809,451 B1 * | 10/2004 | Brown | 310/156.08 |
| 6,841,912 B2 * | 1/2005 | Yamada et al. | 310/156.28 |
| 6,982,504 B2 * | 1/2006 | Brown | 310/36 |
| 7,052,183 B2 * | 5/2006 | Chen et al. | 384/536 |
| 7,075,204 B2 * | 7/2006 | Shiao et al. | 310/156.22 |
| 7,335,071 B1 * | 2/2008 | Motsenbocker | 440/1 |
| 7,365,464 B2 * | 4/2008 | Brown | 310/156.11 |
| 7,461,443 B2 * | 12/2008 | Shiao et al. | 310/153 |
| 7,548,006 B2 * | 6/2009 | Yu | 310/156.12 |
| 7,550,881 B1 * | 6/2009 | Dietrich et al. | 310/51 |
| 2002/0043954 A1 * | 4/2002 | Hallidy | 318/727 |
| 2006/0017342 A1 * | 1/2006 | Park | 310/156.19 |
| 2006/0182378 A1 * | 8/2006 | Chen et al. | 384/536 |
| 2006/0192455 A1 * | 8/2006 | Shiao et al. | 310/156.22 |
| 2007/0138889 A1 * | 6/2007 | Maldener et al. | 310/156.22 |
| 2007/0138890 A1 * | 6/2007 | Yu | 310/156.22 |
| 2008/0111435 A1 * | 5/2008 | Maeda | 310/156.28 |

* cited by examiner

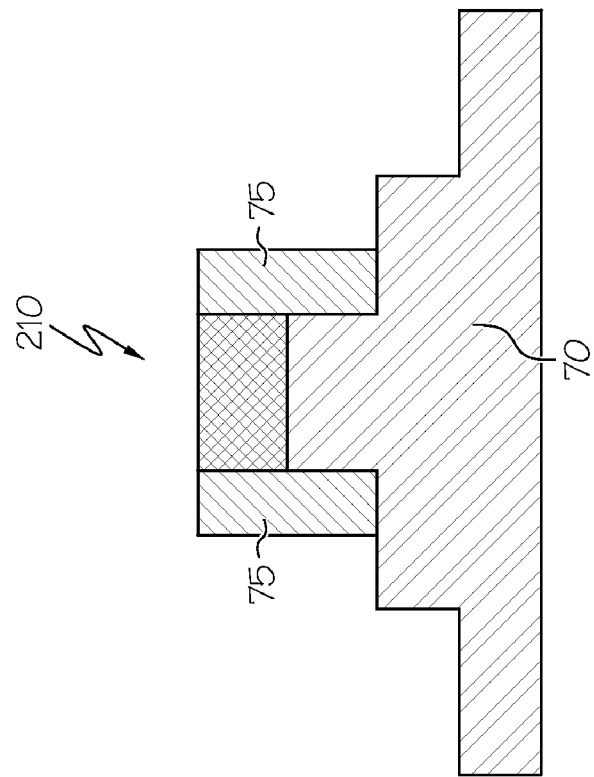
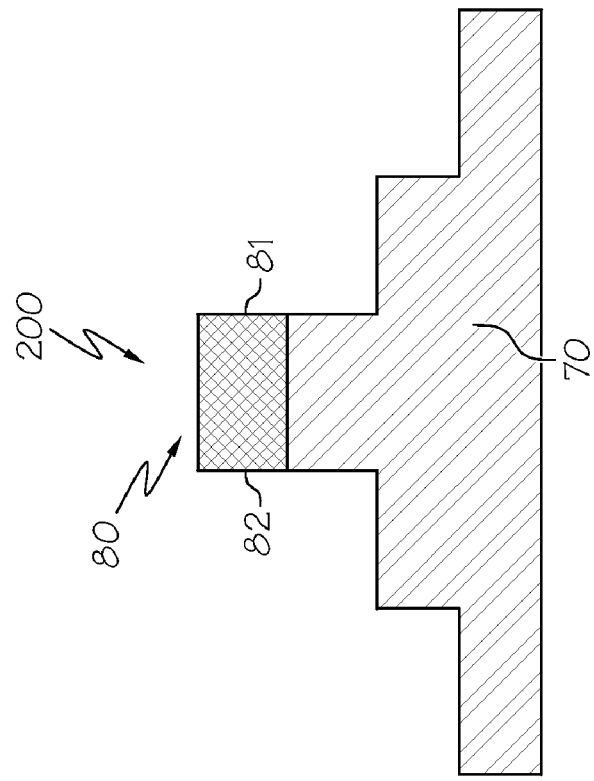

SLEEVE IN END RINGS FOR PERMANENT MAGNET ROTOR

GOVERNMENT RIGHTS

This invention was made with Government support under Contract No. N00019-02-C-3002 awarded by the US Navy. The Government has certain rights in this invention.

BACKGROUND OF THE INVENTION

The present invention relates to permanent magnet rotors, and more particularly to a device and method for retaining the rotor core and the magnetic elements in a secure assembled relation.

Permanent magnet rotors are frequently used in dynamo electric machines such as motors and generators. A typical permanent magnet rotor includes a number of magnets secured to the outer periphery of a rotor core. In recent years, numerous designs of permanent magnet rotors have been proposed since improvements have been made in the quality of the magnets.

Retention of the magnets in predetermined rotational positions about the rotor core is critical to the good functioning of the motor. The attachment of the magnets needs to be strong enough to withstand the centrifugal forces due to the high speed rotation of the rotor or to withstand the angular forces due to unexpected changes in the angular velocity of the rotor. It is imperative to prevent the magnets from moving either axially or radially. If axial movement is allowed, one or more magnets may not properly align with the rotor core and the rotor efficiency will diminish. If radial movement occurs, the physical contact between the rotor and the stator will result in damage to the rotor.

The prior art illustrates a number of methods and techniques for retaining magnets in fixed relation on the rotor core. One way of preventing the movement of the magnets relative to their core in permanent magnet rotors is to install spacers between adjacent magnets. Another way of preventing the movement of the magnet is to cover the area with a binder made of a synthetic material to fill the voids between the magnets and the core. This technique provides a more rigid structure compared to the use of magnets alone, which prevents the magnet movement about the core during motor operation.

A popular way of securing the magnets to the core according to the prior art is to use a tubular sleeve to enclose and hold the magnet segments in place. The sleeve prevents radially outward movement due to centrifugal force and also against axial movement. Furthermore, the prior art also considered heat shrinking the sleeve over the magnets.

FIG. 1 illustrates a sectional front view of a conventional permanent magnet rotor. The Figure illustrates a conventional permanent magnet rotor 10 comprising a core 20, a tubular sleeve 30, a pair of identical configured end plates 40, and magnets 60.

While many of the prior art approaches to retaining magnets on the core have been found satisfactory for their intended applications, many of them fail to adequately retain the magnets in fixed rotational position on the core during high speed operation.

For example, the shrink fit is inadequate to maintain the magnet/spacers or end plates in place during high speed operations. Furthermore, the sleeve fails to retain the end plates in a fixed position on the rotors during high speed operation resulting in dislocation of the end plates. This dislocation will generate high imbalance and results in catastrophic consequences for the rotor.

As can be seen, there is a need for a rotor configuration wherein the magnet segments are contained or fixed in position on the rotor core, especially during high speed operating conditions. Such a configuration should be simple in design and relatively low cost in its manufacture.

SUMMARY OF THE INVENTION

In one aspect of the present invention, a permanent magnet rotor for an electric motor comprises a rotor core; a plurality of permanent magnets placed around the rotor core, the magnets having a first end and a second end; a first end plate at the first end of the magnet and a second end plate at the second end of the magnet; a sleeve enclosing the magnets and the pair of end plates, the sleeve having a top end and a bottom end and a first ring attached to the top end of the sleeve and a second ring attached to the bottom end of the sleeve. The rings extend radially inward toward said end plates.

In another aspect of the present invention the permanent magnet rotor for an electric motor comprises a rotor core; a plurality of permanent magnets placed around the rotor core, the magnets having a first end and a second end; a plurality of spacers located between adjacent magnets; a first end plate at the first end of the magnet and a second end plate at the second end of the magnet; a sleeve enclosing the magnets, spacers, and pair of end plates, the sleeve having a top end and a bottom end; an adhesive coating between the magnets and the sleeve; and a first ring attached to the top end of the sleeve and a second ring attached to the bottom end of the sleeve. The rings extend radially inward toward the end plates. The sleeve being heat shrunk into the magnets. The pair of rings is attached to the tubular sleeve by welding.

Another aspect of the present invention contemplates a method for preventing dislocation of the magnets in a permanent magnet rotor. The method comprises a step of providing a rotor core having a plurality of magnets placed around the rotor core. Another step may include enclosing the magnets and the pair of end plates with a sleeve. A further step may include retaining the magnets with a pair of rings attached to the top and bottom end of the sleeve. The rings extending radially inwardly towards the end plates to retain the sleeve and the magnets in place. The method furthermore comprises the step of retaining the magnets with spacers attached between adjacent magnets. In addition, the method comprises the step of inserting shim spacers between the end plates and each end of the sleeve. Furthermore, the method comprises removing the shim spacers from the rotor.

These and other features, aspects and advantages of the present invention will become better understood with reference to the following drawings, description and claims.

BRIEF DESCRIPTION OF THE DRAWINGS

FIGS. 4a-4d illustrate, step by step, the method according to the present invention to produce the permanent magnet rotor.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides for a rotor configuration wherein the magnet segments may be contained or fixed in a secured position on the rotor core, especially during high speed operating conditions. As discussed above, a conventional permanent magnet rotor requires a strong attachment between the sleeve and the magnet in order to avoid dislocation of the magnets and prevent the malfunctioning of the rotor. The present invention may increase the required securement ability, thereby highly reducing the possibility of the dislocation of the magnets.

The present invention may form a rotor assembly that strongly holds the magnets in place. Basically, one embodiment the present invention may add a pair of rings to the sleeve that may tightly engage and press against the end plates and thereby may provide additional securement against axial and radially shifting of the magnets. This design may result in a substantial cost and time benefit in the manufacture of motors and generators.

Figure 1:
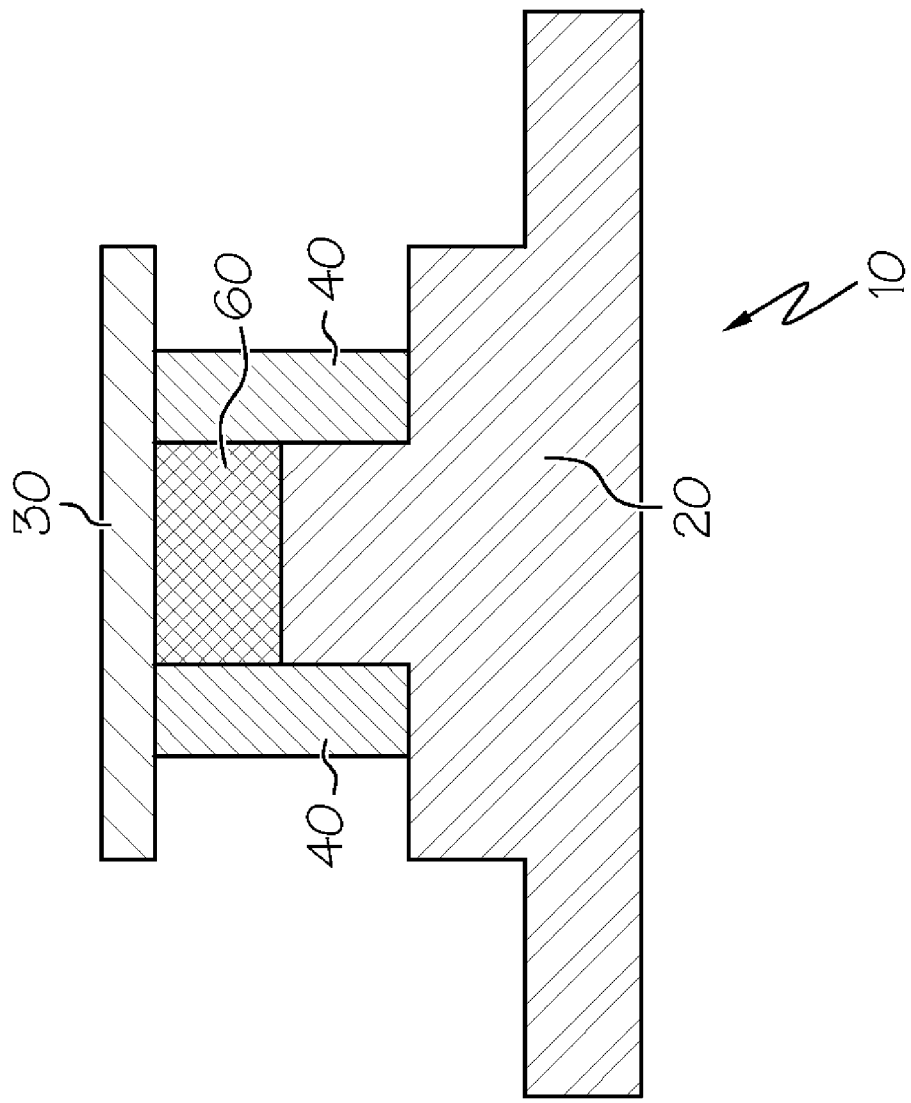
FIG. 1 illustrates a sectional front view of a conventional permanent magnet rotor according to the prior art.
Figure 2A:
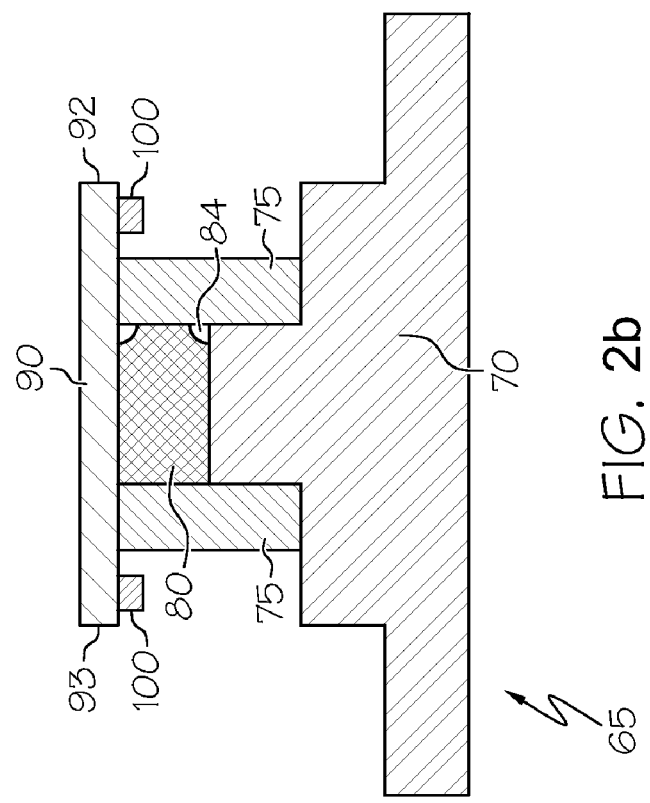
FIG. 2a illustrates a sectional front view of the permanent magnet rotor according to one embodiment of the present invention showing the magnets attached to the core.

FIG. 2a illustrates a sectional front view of the permanent magnet rotor 65 according to one embodiment of the present invention. The rotor 65 according to this embodiment may comprise a rotor core 70, a plurality of segmented magnets 80 positioned on the outer periphery of the core 70, a pair of end plates 75 located at each end of said magnets 80, a tubular sleeve 90 enclosing the magnets 80 and the end plates 75, and a pair of rings 100 attached to the top and bottom end 92, 93 of tubular sleeve 90. The rings 100 may extend radially inward towards said end plates 75.

One embodiment of the present invention contemplates welding into the inner periphery of the sleeve 90 a pair of identically shaped annular rings 100. The rings 100 may serve to secure the end plates 75 preventing the magnets 80 from shifting in the radial direction during operation of the rotor 65.

The core 70, sleeve 90, magnets 80, and rings 100 may be formed of any materials suitable for the conditions that may result from the intended use.

The tubular sleeve 90 may be made of a non-magnetic metal such as stainless steel. The inner diameter of the sleeve 90 may be slightly less than the outer diameter of the magnets 80 on the core 70, and consequently when the sleeve 90 is placed over the magnets 80 creating tension in the sleeve 90. As exemplary, the sleeve 90 may be installed on the rotor 65 by a heat shrinking operation, in which the rotor 65 is cooled and the sleeve 90 is heated to a high temperature to cause the sleeve 90 to expand relative to the rotor 65. The sleeve 90 encloses the magnet 80 and end plates 75, and may be heat shrunk to form an interference fit with the rotor 65.

In another embodiment of the present invention the sleeve 90 may be installed without using heat shrinking.

The permanent magnets 80 may be ceramic magnets and each magnet 80 may have a curved inner surface (not shown) having a radius of curvature approximately equal to the radius of curvature of outer surface of the core 70. It is important to have the best possible magnetic homogeneity of the magnets 80 used in the rotor 65, since non-uniformity of magnets 80 will cause damage to the rotor 65. In addition, it is important to maintain the same spacing between adjacent magnets to achieve a balanced rotor construction.

In another embodiment of the present invention, the magnets 80 may be further secured to the core by using an adhesive coating.

The end plates 75 may be axially spaced facing the surface of the core 70 to sandwich the magnets 80. The end plates 75 may prevent the magnets 80 from contaminating the interior of the motor (not shown) in the event the magnets 80 crack or chip during assembly, handling or high speed rotor rotation. In addition, the end plates 75 may cooperate with the sleeve 90 to enclose the magnets 80, thereby preventing the magnets 80 from moving axially. The radius of the end plates 75 may be equal to or slightly less than the overall combined radius of core 70 and magnets 80 when assembled.

Figure 2B:
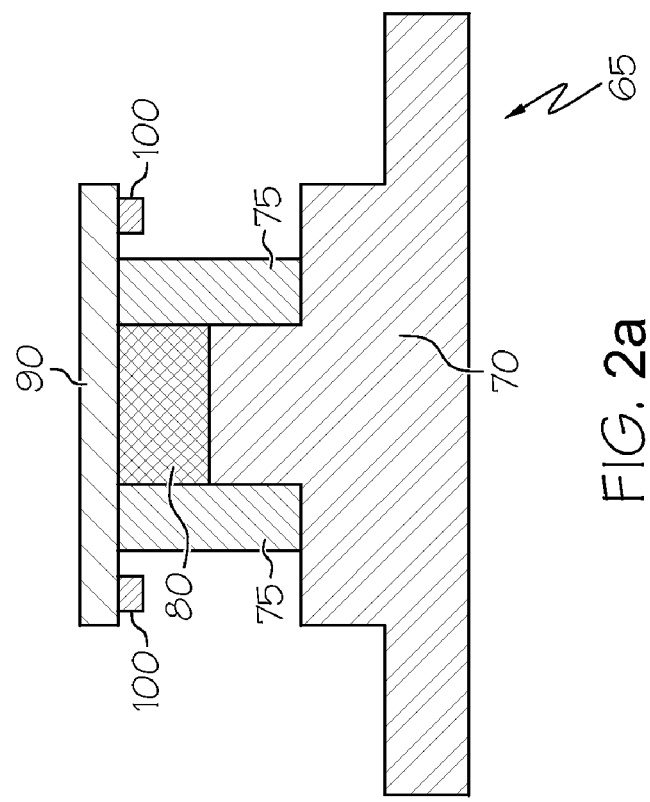
FIG. 2b illustrates a sectional front view of the permanent magnet rotor according to one embodiment of the present invention showing magnets and spacers attached to the core.

FIG. 2b shows another aspect of the present invention. In this aspect, spacers 84 may be added between adjacent magnets 80. The combination of spacers/magnets 85 may add additional securement to the rotor 65. The spacers 84 may be made of electrically conductive, non-magnetisable material.

The rings 100 may be made of the same material as the sleeve 90. The rings 100 may be placed on the top and bottom ends 92, 93 of the sleeve 90 and extend radially inwardly towards the end plates 75. The rings 100 may tightly engage and press against the end plates 75 and thereby provide added assurance against axial shifting of the magnets 80. The rings 100 may be attached to the sleeve 90 by using any well known techniques such as inter-fitting, bonding, and welding. As an exemplary attachment method, the present invention may use welding.

Figure 3:
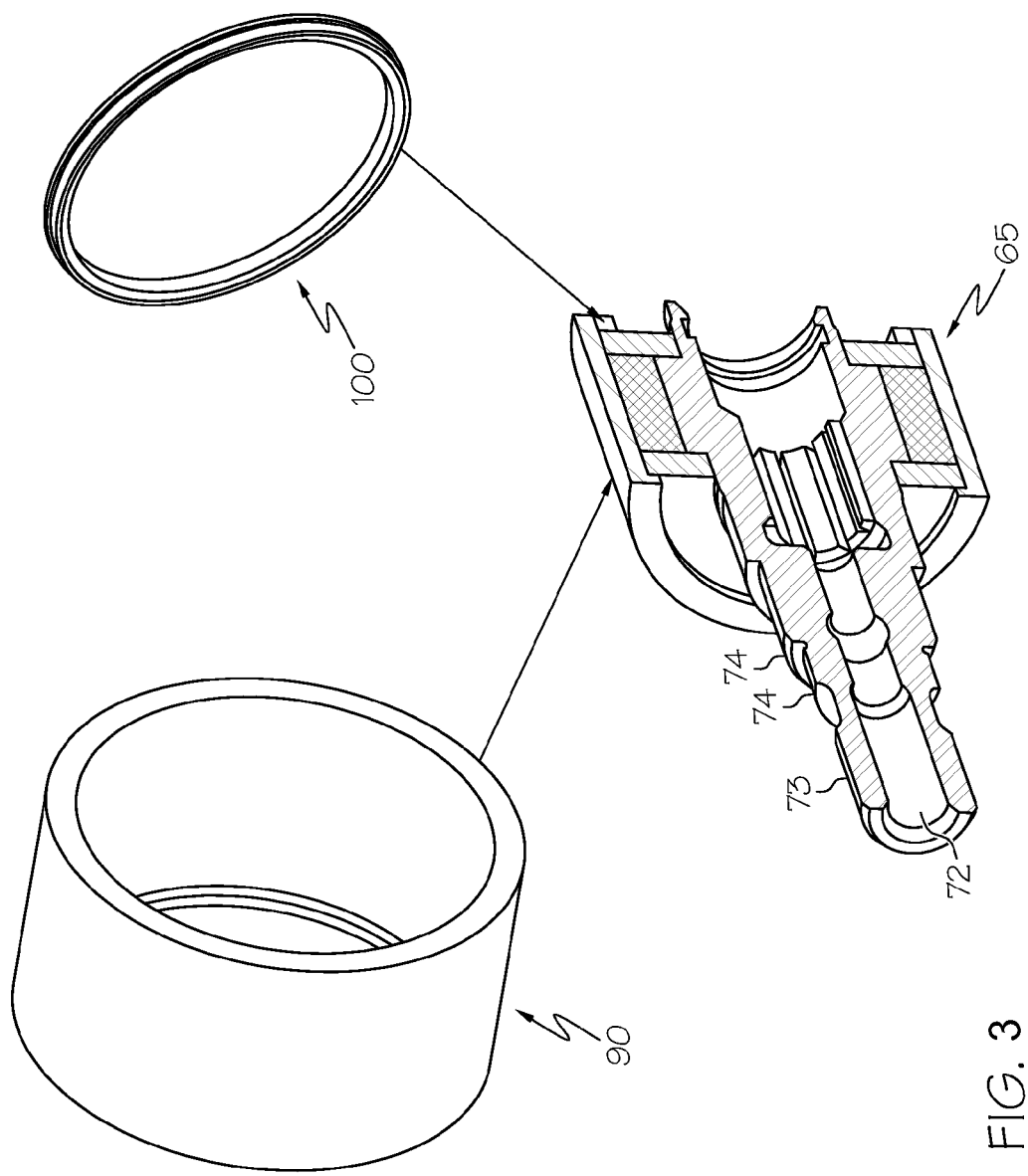
FIG. 3 illustrates a perspective sectional view of the permanent magnet rotor showing an exploited view of the sleeve and the ring according to the present invention.

FIG. 3 illustrates a perspective sectional view of the permanent magnet rotor 65 showing an exploited view of the sleeve 90 and the ring 100 according to the present invention.

The core 70 may be made of steel or Ni—Cr alloy, and may be shaped to be rotatably supported by bearings (not shown) within a conventional motor stator (not shown). The core 70 may have a cylindrical shape with a central bore 72 extending through the central axis. A plurality of ribs 74 may be formed on the outer surface 73 of the core 70.

In addition, the present invention contemplates a method for a permanent magnet rotor. The method comprises a step 200 of providing a rotor core (e.g., rotor core 70) having a plurality of permanent magnets (e.g., magnets 80) placed around said rotor core (e.g., rotor core 70). (FIG. 4a).

A further step 210 may include installing a pair of end plates (e.g., end plates 75) at each end of the magnets (e.g. 80) (FIG. 4b).

Figure 4D:
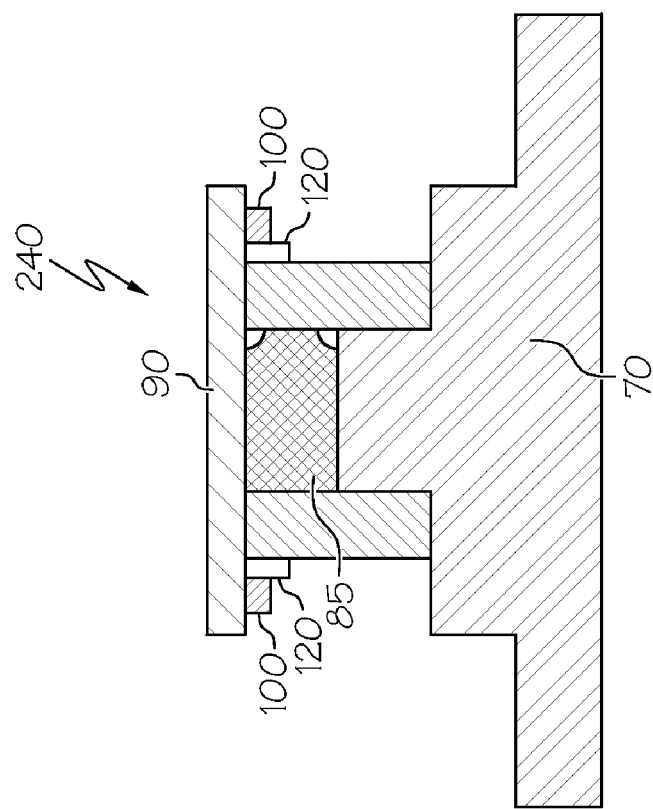
Figure 4C:
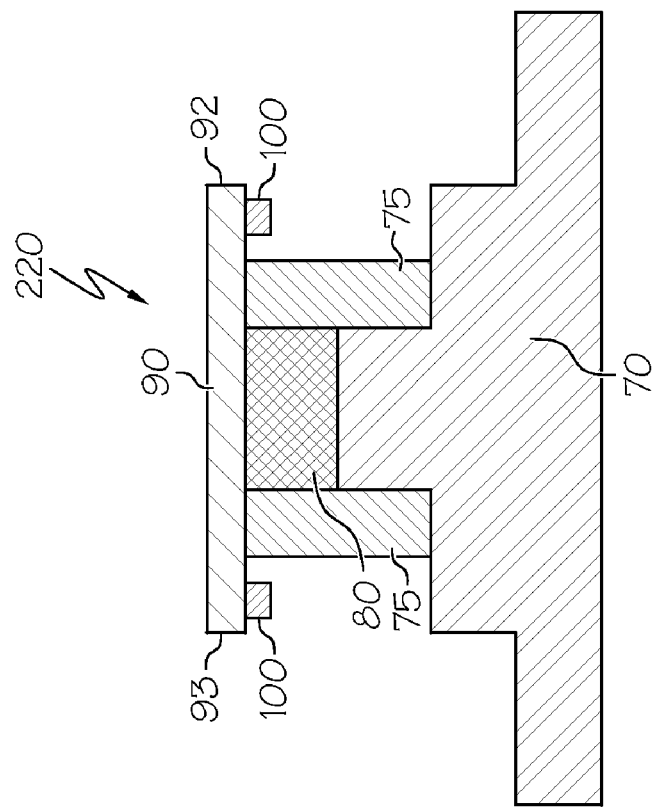
Figure 5:
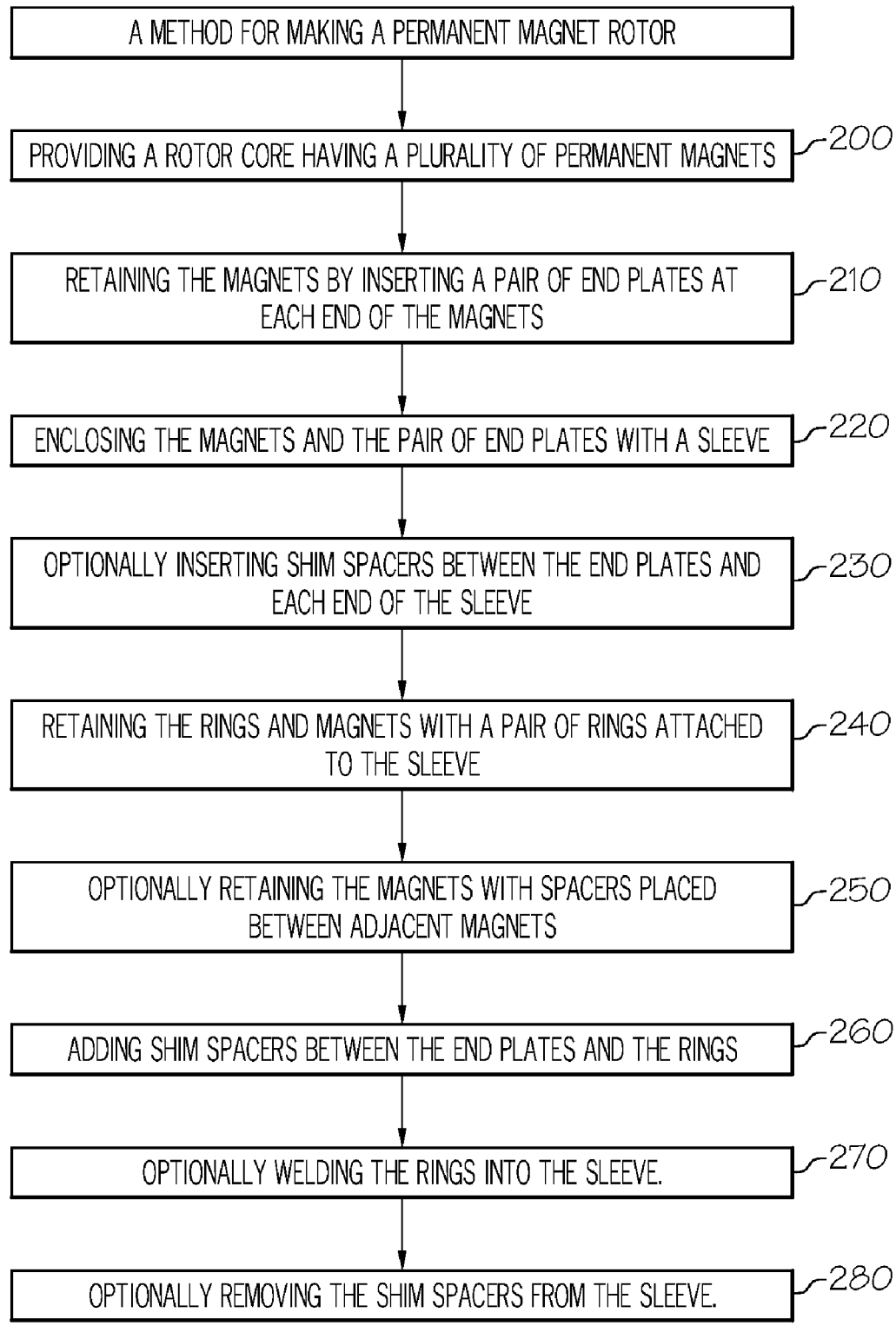
FIG. 5 illustrates a flow chart of the steps of the method according to the present invention.

A further step 220 may include enclosing the magnets (e.g. magnets 80) and the pair of end plates (e.g. end plates 75) with a sleeve (e.g. sleeve 90). The sleeve having a top end (e.g. top end 92) and a bottom end (e.g. bottom end 93. (FIG. 4c)

An optionally step 230 may include inserting shim spacers (e.g. shim spacers 120) between the end plates (e,g, end plates 75) and each end of the sleeve (e.g. sleeve 90). A further step 240 may include retaining the sleeve e.g. sleeve 90) and magnets (e.g., magnets 80) by placing a pair of rings (e.g. rings 100) at the top and bottom end (e.g. top and bottom end 92, 93) of the sleeve (e.g. sleeve 90). The rings extend radially inwardly towards the end plates to secure the sleeve and the magnets. (FIG. 4d)

Furthermore, the method contemplates optionally the step 250 of retaining the magnets with spacers (e.g. spacers 84) placed between adjacent magnets (e.g. magnets 80).

Furthermore, the method of the present invention contemplates step 260 of adding shim spacers (e.g. shim spacers 120) between the end plates and the rings. (FIG. 4*d*)

In addition, method according to the present invention contemplates a step 270 of welding the rings 100 into the tubular sleeve 90. (FIGS. 4*c* and 4*d*)

Furthermore, the method of the present invention contemplates step 280 of removing the shim spacers 120 from the rotor 65.

These and other features, aspects and advantages of the present invention will become better understood with reference to the following drawings, description and claims.

It should be understood, of course, that the foregoing relates to exemplary embodiments of the invention and that modifications may be made without departing from the spirit and scope of the invention as set forth in the following claims.

We claim:

1. A permanent magnet rotor for an electric motor comprising:
    a rotor core;
    a plurality of permanent magnets placed around said rotor core, said magnets having first ends and second ends;
    a first end plate at the first ends of said magnets and a second end plate at said second ends of the magnets;
    a sleeve enclosing said magnets and said first and second end plates, said sleeve having a top end and a bottom end;
    a first planar annular ring attached to said top end of the sleeve outwardly from the first end plate and a second planar annular ring attached to said bottom end of the sleeve outwardly from the second end plate;
    wherein said rings extend radially inward toward an axis of the rotor; and
    wherein the first and second rings are oriented with their respective planes orthogonal to the axis of the rotor.

2. The rotor according to claim 1, further comprising an adhesive coating between said magnets and said sleeve.

3. The rotor according to claim 1, wherein said sleeve is heat shrunk into said magnets.

4. The rotor according to claim 1, wherein said first and second rings are attached to the sleeve by inter-fitting, bonding, or welding.

5. The rotor according to claim 1, wherein said first and second rings are attached to the sleeve by welding.

6. The rotor according to claim 1, further comprising spacers located between adjacent magnets.

7. A permanent magnet rotor for an electric motor comprising:
    a rotor core;
    a plurality of permanent magnets placed around said rotor core, said magnets having a first end and a second end;
    a plurality of spacers located between adjacent magnets;
    a first end plate at the first end of said magnet and a second end plate at said second end of the magnet;
    a cylindrical sleeve enclosing said magnets, spacers, said sleeve having an integral inwardly projecting, annular shoulder at a first end, the annular shoulder having a planar shape and positioned with its plane orthogonal to an axis of the rotors and positioned outwardly of the first end plate;
    a planar ring attached inwardly to a second end of the sleeve with its plane orthogonal to the axis of the rotor and positioned axially in the sleeve outwardly of the second end plate and spaced a finite axial distance from the second end plate; and
    wherein the planar ring is provided with ridges on an outer surface thereof and the ring is attached to the sleeve with welds.

8. The rotor according to claim 7, further comprising an adhesive coating between said magnets and said sleeve.

9. A method for preventing dislocation of magnets in a permanent magnet rotor, the method comprising the steps of:
    providing a rotor core having a plurality of permanent magnets placed around said rotor core, said magnets having a first end and a second end;
    installing a pair of end plates at each end of said magnets;
    enclosing said magnets and said pair of end plates with a sleeve, the sleeve having a top end and a bottom end;
    positioning at least one planar annular ring in the sleeve outwardly of at least one of the end plates so that the at least one ring is oriented with its plane orthogonal to an axis of the rotor; and
    welding the ring to the sleeve.

10. The method according to claim 9, further comprising retaining the magnets with spacers attached between adjacent magnets.

* * * * *